(12) United States Patent
Dalmia (10) Patent No.: US 11,652,585 B1
(45) Date of Patent: May 16, 2023

(54) IMPLEMENTING AND OPERATING AN ETHERNET NETWORK USING DYNAMIC PHYSICAL LAYER NODE ID ASSIGNMENTS

(71) Applicant: Kamal Dalmia, Fremont, CA (US)

(72) Inventor: Kamal Dalmia, Fremont, CA (US)

( * ) Notice: Subject to any disclaimer, the term of this patent is extended or adjusted under 35 U.S.C. 154(b) by 184 days.

(21) Appl. No.: 17/392,992

(22) Filed: Aug. 3, 2021

Related U.S. Application Data

(60) Provisional application No. 63/073,123, filed on Sep. 1, 2020.

(51) Int. Cl.
*H04L 5/00* (2006.01)
*H04L 43/10* (2022.01)
*H04L 12/40* (2006.01)

(52) U.S. Cl.
CPC .......... *H04L 5/0044* (2013.01); *H04L 12/40* (2013.01); *H04L 43/10* (2013.01)

(58) Field of Classification Search
None
See application file for complete search history.

(56) References Cited

U.S. PATENT DOCUMENTS

| 2009/0247241 A1* | 10/2009 | Gollnick | G06F 1/1626 |
| | | | 455/574 |
| 2019/0313446 A1* | 10/2019 | Kim | H04W 74/02 |
| 2021/0006432 A1* | 1/2021 | Krieger | H04L 12/6402 |
| 2021/0055963 A1* | 2/2021 | An | H04L 12/10 |

* cited by examiner

*Primary Examiner* — Diane L Lo
(74) *Attorney, Agent, or Firm* — Brian R. Short (57) ABSTRACT

Apparatuses, methods, and systems for a Dynamic PHY-Level Collision Avoidance (DPLCA) based Ethernet network are disclosed. The Dynamic PHY-Level Collision Avoidance (DPLCA) Ethernet network includes an Ethernet bus comprising a shared cable, and a plurality of Ethernet nodes connectable to the Ethernet bus. Each of the Ethernet nodes is configured to autonomously select a unique node identifier, including the Ethernet node operating to transmit over the Ethernet bus either a special symbol or packet during a time slot designated for the unique node identifier, monitor any collisions with the transmitted special symbol or packet, and autonomously select the unique node identifier if no collision is detected.

20 Claims, 6 Drawing Sheets

---

Monitoring and tracking, by the Ethernet node, unique selected identifiers of other Ethernet nodes connected to the Ethernet bus, wherein the autonomously selecting of the unique node identifier of the Ethernet node is based on the monitored and tracked unique selected identifiers of the other Ethernet nodes
305

▼

Autonomously selecting, by the Ethernet node, a unique node identifier
310

▼

Transmitting, by the Ethernet node, over an Ethernet bus either a special symbol or packet during a time slot designated for the unique node identifier
320

▼

Monitoring, by the Ethernet node, any collisions with the transmitted special symbol or packet
330

▼

Autonomously selecting, by the Ethernet node, the unique node identifier if no collision is detected
340

IMPLEMENTING AND OPERATING AN ETHERNET NETWORK USING DYNAMIC PHYSICAL LAYER NODE ID ASSIGNMENTS

RELATED PATENT APPLICATIONS

This patent application claims the benefit of U.S. Provisional Patent Application Ser. No. 63/073,123, filed Sep. 1, 2020, which is herein incorporated by reference.

FIELD OF THE DESCRIBED EMBODIMENTS

The described embodiments relate generally to Ethernet communications. More particularly, the described embodiments relate to systems, methods and apparatuses for implementing and operating an Ethernet network using dynamic physical layer node ID assignments.

BACKGROUND

Transferring information between computers and other electronic devices can be implemented using a variety of different standards and technologies. Ethernet is a desirable protocol for networking. However, an issue with Ethernet is that the Ethernet PHY standards are often written for "point to point" network topology. In such networks, only two nodes are connected to each other at a time via a given physical wire. Nodes that are not directly connected to the same wire communicate to each other via packet switching equipment.

Shared cabled based systems are called "multi-drop" systems. Sometimes such systems are also known as "mixing segment" based systems. There are some Ethernet standards that support multi-drop topology. However, the existing Ethernet mechanisms are not conducive to applications that desire plug and play deployment such as home networking over coaxial cables. One type of multi-drop Ethernet network provides means for operation over coaxial network using CSMA-CD (Carrier-sense multiple access with collision detection) access mechanism. CSMA-CD is a collision and collision-detection based networking protocol. Due to efficiency and scalability issues, such systems are rarely used in modern Ethernet communication systems. TDM (time division multiple access) is another mechanism used in some multi-drop Ethernet systems. In a TDM system, fixed time slots are allocated to nodes which results in pre-determined bandwidth allocation to the nodes. TDM systems are wasteful in bursty traffic scenarios when certain nodes under-utilize their allocation of bandwidth. Some other Ethernet networks use a PHY Level Collision Avoidance (PLCA) mechanism (as described in IEEE 802.3cg) to improve the bandwidth utilization efficiency of the system compared to TDM networks. PLCA requires user to manually pre-program node identification (ID) information which prevents dynamic and automatic provisioning of the network. This constraint is undesirable as it prevents Hot-insertion and Hot-removal of nodes from the network making the network not plug and play capable. It is therefore desirable to provide a mechanism to automatically assign node IDs perform dynamic PHY-level collision avoidance for automated configuration of the network.

It is desirable to have methods, apparatuses, and systems for implementing and operating an Ethernet network using dynamic physical layer node ID assignments.

SUMMARY

An embodiment includes a Dynamic PHY-Level Collision Avoidance (DPLCA) based Ethernet network. The network includes an Ethernet bus comprising a shared cable, and a plurality of Ethernet nodes connectable to the Ethernet bus. Each of the Ethernet nodes contains DPLCA circuitry which is configured to autonomously select a unique node identifier, including the Ethernet node operating to transmit over the Ethernet bus either a special symbol or packet during a time slot designated for the unique node identifier, monitor any collisions with the transmitted special symbol or packet, and autonomously select the unique node identifier if no collision is detected.

Another embodiment includes an Ethernet node. The Ethernet node is configured to autonomously select a unique node identifier, including the Ethernet node operating to transmit over an Ethernet bus either a special symbol or packet during a time slot designated for the unique node identifier, monitor any collisions with the transmitted special symbol or packet, and autonomously select the unique node identifier if no collision is detected.

Another embodiment includes a method. The method includes autonomously selecting, by the Ethernet node, a unique node identifier, including transmitting, by the Ethernet node, over an Ethernet bus either a special symbol or packet during a time slot designated for the unique node identifier, monitoring, by the Ethernet node, any collisions with the transmitted special symbol or packet, and autonomously selecting, by the Ethernet node, the unique node identifier if no collision is detected.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for implementing and operating an Ethernet network using dynamic physical layer node ID assignments. The methods, apparatuses, and systems provide for an Ethernet network over multi-drop topologies. Further, the described embodiments include transmitting and receiving Ethernet signals and data over shared cabling and multiple Ethernet nodes. The described embodiments include Ethernet network nodes that are capable of dynamic network node configuration via a Dynamic PHY-Level Collision Avoidance (DPLCA) mechanism which enables addition or deletion of network nodes via assignment of Node IDs on the fly.

Further, the described embodiments relate to information networks and specifically to transmitting Ethernet information over communication lines such as coaxial cable (hereinafter "coax") or twisted-pair cables, thereby forming an Ethernet based Local Area Network (LAN). More specifically, the described embodiments relate to shared-medium Ethernet networks, also referred to as multi-drop networks, capable of operating with multiple nodes connected to a "mixing segment". Mixing segment is an IEEE defined term for shared wiring. Such shared-wiring networks can be referred to as multi-drop networks.

Figure 1:
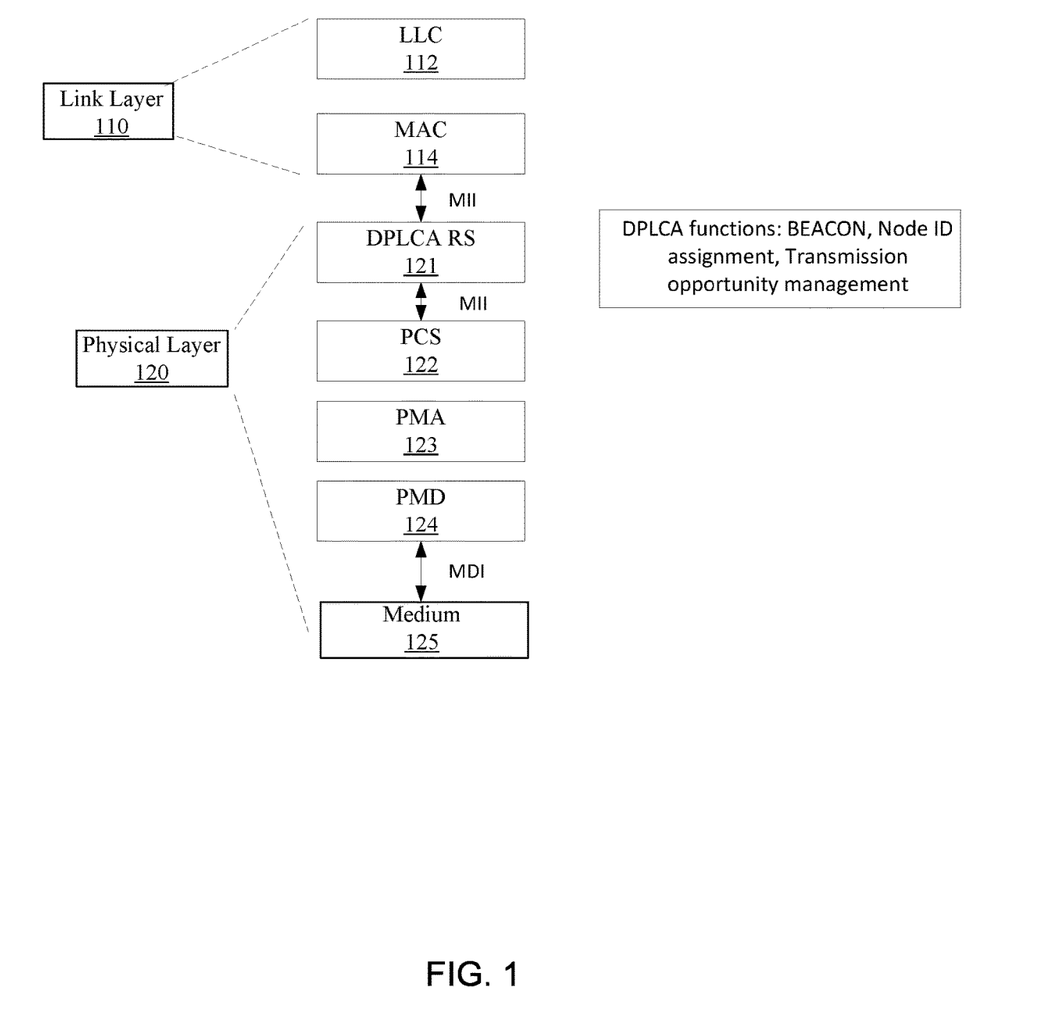
FIG. 1 show network layers and sublayers of an Ethernet network, according to an embodiment.

FIG. 1 show network layers 110, 120 and sublayers 112, 114, 121, 122, 123, 124, 125 of an Ethernet network, according to an embodiment. For an embodiment, the Ethernet network is comprised of 2 or more Ethernet Nodes (ENs). For an embodiment, each EN is capable of transmitting and receiving data over the Ethernet network. Each EN incorporates certain key features to allow the EN to operate in a "multi-drop" topology. For an embodiment, each Ethernet Node includes a Link Layer 110 and Physical Layer 120 circuitry. Additionally, at least some embodiments of the Ethernet nodes incorporate application layer circuitry.

The link layer 110 include conventional Ethernet sublayers such as MAC (Medium Access Control) 112 and LLC (Logical Link Control) 112. To be compatible with such existing devices containing Ethernet Link Layer 110, the Ethernet Nodes in of the described embodiments incorporate modifications to only the Physical layer 120 and not to the MAC layer 114. For at least some embodiments, the modifications are for the purpose of (b) dynamic Node ID assignment, and (c) transmission opportunity management.

The Physical layer 120 circuitry includes conventional sublayers, such as, a Physical media dependent sublayer (PMD) 124. For an embodiment, a portion of the Physical Layer 124 is responsible for interfacing to the transmission medium.

For an embodiment, the Physical layer 120 includes a Physical media access sublayer (PMA) 123. For an embodiment, the PMA 123 is a portion of the Physical Layer 120 that contains the functions for transmission, reception, collision detection, clock recovery and skew alignment.

For an embodiment, the Physical layer 120 includes a Physical coding sublayer (PCS) 122. For an embodiment, the PCS 122 is a portion of the Physical Layer 120 that contains functions to encode data bits for transmission via the PMA and to decode the received conditioned signal from the PMA.

For an embodiment, the Physical layer 120 includes a new reconciliation sublayer function called DPLCA (Dynamic PHY-Level Collision Avoidance) 121. For an embodiment, the DPLCA 121 is added to the Physical layer 120 which handles the functions related to dynamically obtaining a Node ID for the said node EN and performing dynamic PHY level collision avoidance functions.

Figure 2:
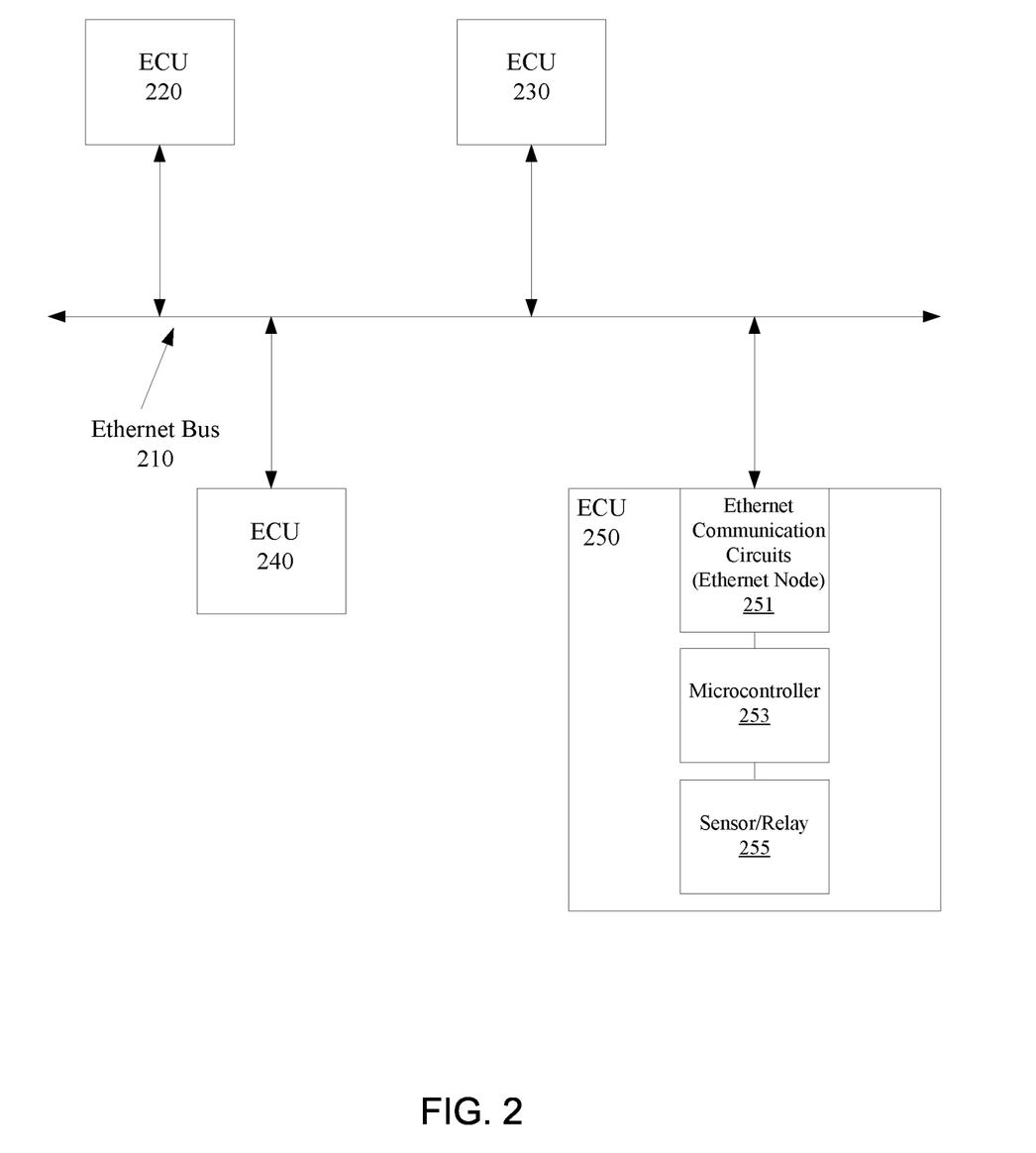
FIG. 2 shows a block diagram of Ethernet nodes connected to and Ethernet bus, according to an embodiment.

FIG. 2 shows a block diagram of Ethernet nodes 220, 230, 240, 250 connected to and Ethernet bus 210, according to an embodiment. This embodiment provides a Dynamic PHY-Level Collision Avoidance (DPLCA) based Ethernet network. For an embodiment, the Ethernet network includes an Ethernet bus that includes a shared cable. For an embodiment, the shared cable includes a mixing segment. As shown, the Ethernet network includes the plurality of Ethernet nodes 220, 230, 240, 250 connectable to the Ethernet bus. A mixing segment is a term of usage by the IEEE (Institute of Electrical and Electronics Engineers). The 10BASE-T1M mixing segment (1.4.331) is a single balanced pair of conductors that may have more than two MDIs attached.

Figure 4:
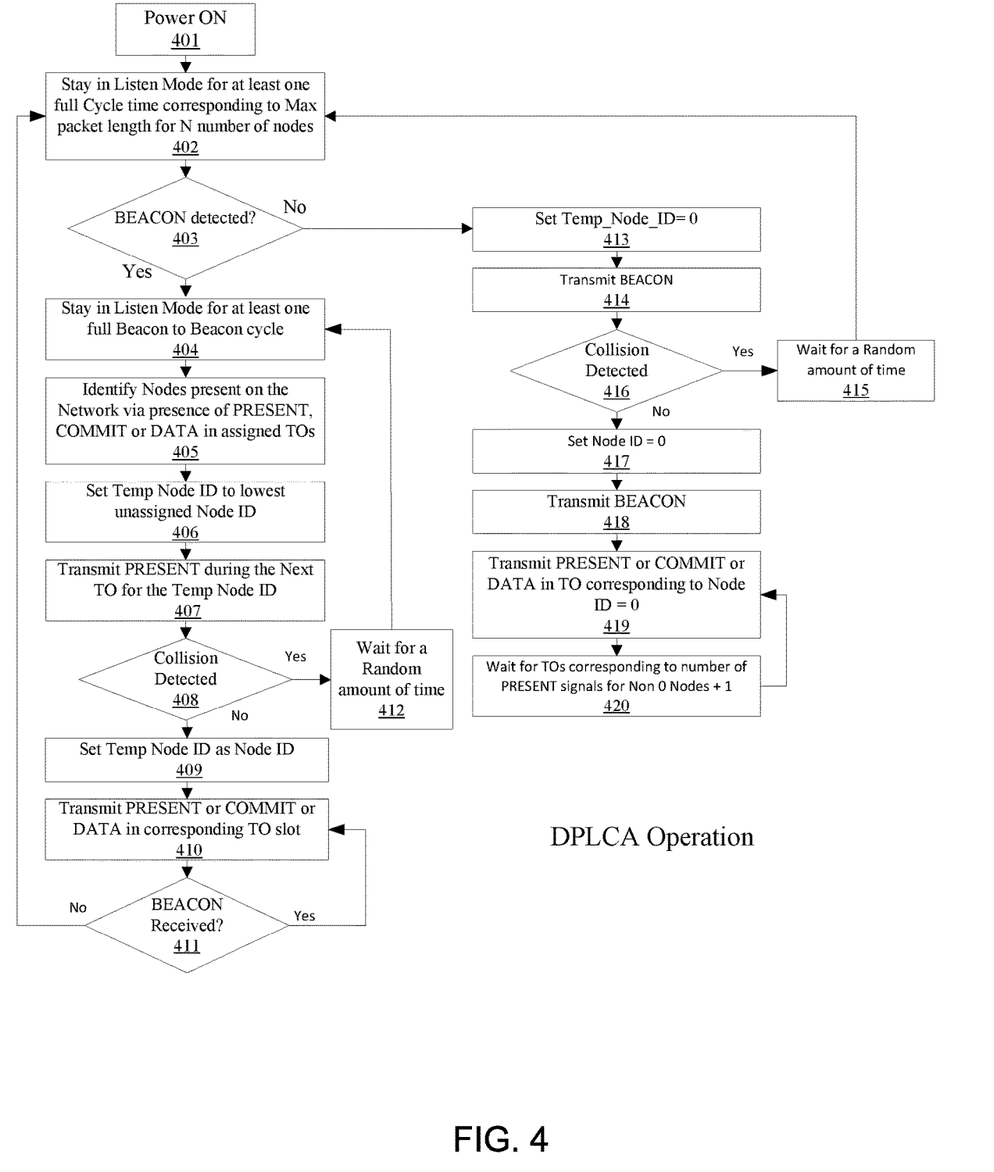
FIG. 4 is a flow chart that shows steps of operation of a DPLCA Ethernet network, according to an embodiment.
Figure 5:
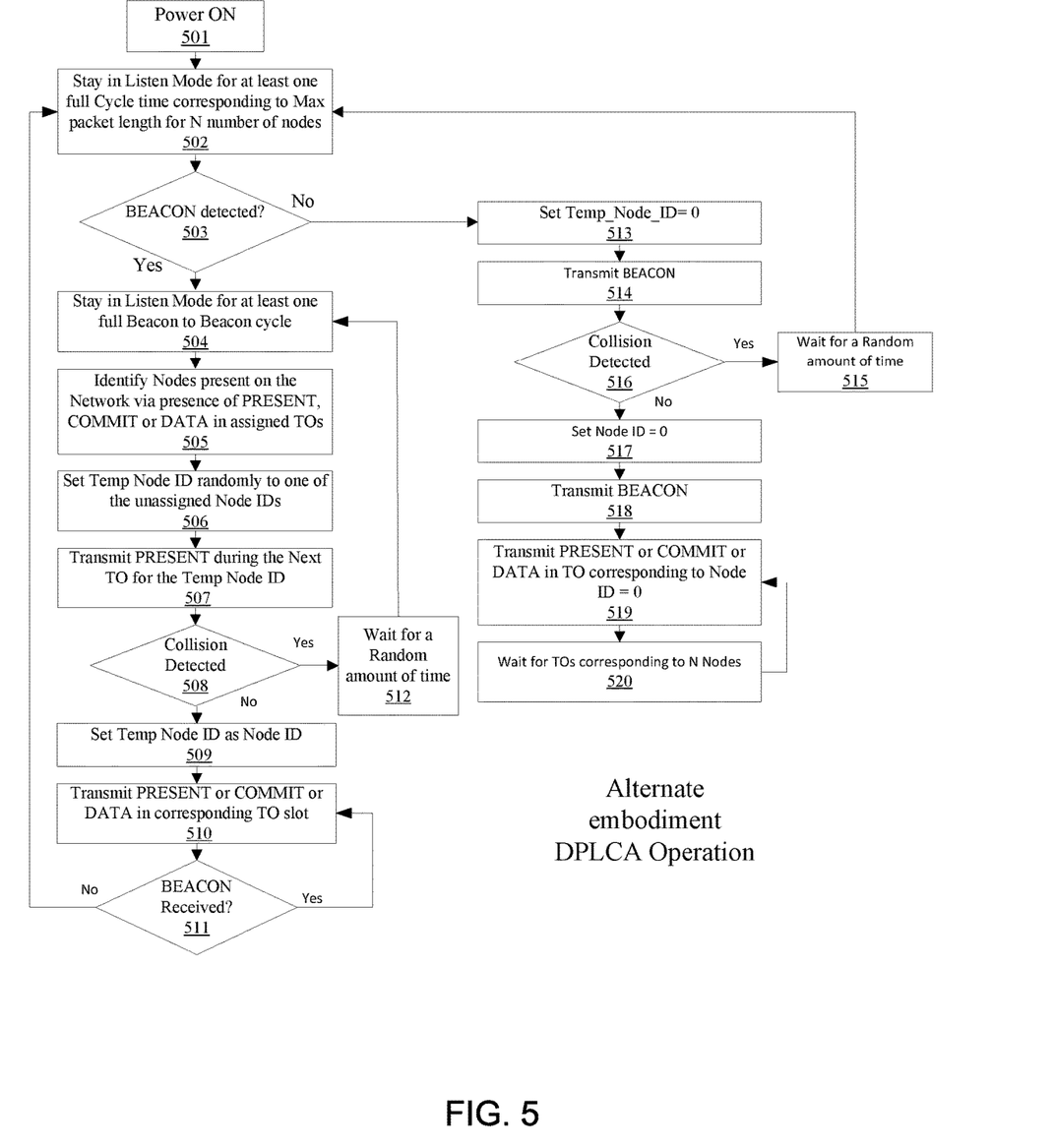
FIG. 5 is a flow chart that shows steps of operation of a DPLCA Ethernet network, according to another embodiment.

For an embodiment, each of the Ethernet nodes is operative to autonomously select a unique node identifier (referred to as Temp Node ID in FIGS. 4, 5). For an embodiment, this includes each Ethernet node operating to transmit over the Ethernet bus 210 either a special symbol or packet during a time slot (also referred to as a TO (transmit opportunity) in FIGS. 4, 5) designated for the unique node identifier, monitor any collisions with the transmitted special symbol or packet, and autonomously select the unique node identifier if no collision is detected.

For an embodiment, monitoring and detecting collisions includes receiving a corrupted signal at the receiver of the Ethernet node due to a transmission by a second Ethernet node that is present (connected to) on the bus while the Ethernet node is transmitting at the same time. That is, the Ethernet node detects a collision if the Ethernet node receives a corrupted signal simultaneous with the Ethernet node transmitting the special symbol or packet.

For an embodiment, when a collision is detected the Ethernet node further operates to repeat autonomous selection of another node identifier. For an embodiment, this includes the Ethernet node operating to transmit over the Ethernet bus either the special symbol or packet during a time slot designated for the other unique node identifier, monitor any collisions with the transmitted special symbol or packet, and autonomously select the other unique node identifier if no collision is detected. As previously stated, the time slots can also be referred to an transmit opportunities.

For an embodiment, each node identifier is autonomously selected according to a sequence determined by DPLCA functionality contained in the plurality of Ethernet nodes connected to the Ethernet bus. For an embodiment, as shown in FIG. 5, the sequence starts with any available node identifier. For an embodiment, as shown in FIG. 4, the sequence starts with a lowest node identifier and increments up. For an embodiment, at least some other Ethernet nodes connected to the Ethernet bus have a statically configured node identifier. This allows the described embodiments that include autonomous node identifier selection to operate and coexist with prior static or manually Ethernet nodes that have assigned node identifiers.

For an embodiment, a one of the plurality of Ethernet nodes autonomously select a node identifier of ID=0. This is depicted at 413 of FIGS. 4, and 513 of FIG. 5. For an embodiment, a one of the plurality of Ethernet nodes is statically assigned a node identifier of ID=0. For an embodiment, the Ethernet node that autonomously the unique node identifier of ID=0 further operates as a coordinator node and transits a beacon that includes a special character set that allows for identification of each of the time slots.

For an embodiment, when an Ethernet node of the plurality of Ethernet nodes disconnects from the Ethernet bus, a time slot corresponding with the unique node identifier autonomously by the Ethernet node becomes available for another Ethernet node to autonomously select. The result is a plug and play Ethernet network.

For at least some of the DPLCA embodiments allow nodes to start with a possibly non-unique PLCA node ID and autonomously select a unique node ID at a later time. Additionally, DPLCA defines a method to designate a single node with ID=0 (coordinator).

Figure 3:
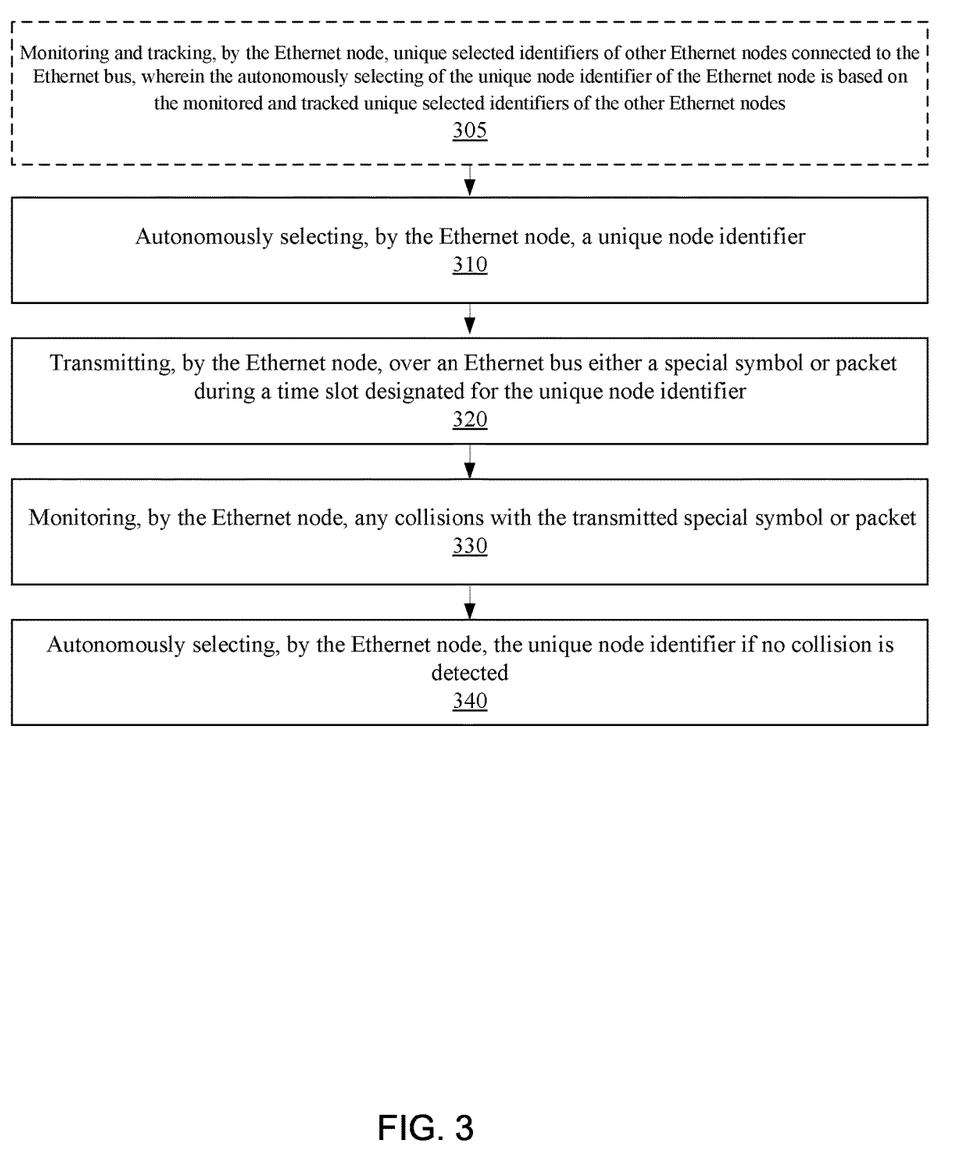
FIG. 3 is a flow chart that includes steps of a method of operating an Ethernet network using dynamic physical layer node ID assignments, according to an embodiment.

FIG. 3 is a flow chart that includes steps of a method of operating an Ethernet network using dynamic physical layer (DPLCA) node ID assignments, according to an embodiment. A first step 310 includes autonomously selecting, by the Ethernet node, a unique node identifier. For an embodiment, autonomously selecting, by the Ethernet node, a unique node identifier includes a second step 320 of transmitting, by the Ethernet node, over an Ethernet bus either a special symbol or packet during a time slot designated for the unique node identifier, a third step 330 of monitoring, by the Ethernet node, any collisions with the transmitted special symbol or packet, and a fourth step 340 of autonomously selecting, by the Ethernet node, the unique node identifier if no collision is detected.

An embodiment includes an initial step 305. The initial step 305 includes monitoring and tracking, by the Ethernet node, unique selected identifiers of other Ethernet nodes connected to the Ethernet bus, wherein the autonomously selecting of the unique node identifier of the Ethernet node is based on the monitored and tracked unique selected identifiers of the other Ethernet nodes. That is, Ethernet nodes connected to the Ethernet bus operate to monitor and track unique selected identifiers of other nodes connected to the Ethernet bus. Further, the autonomously selecting of the unique node identifier of the node is based on the monitored and tracked unique selected identifiers of the other nodes. That is, the Ethernet node monitors identifiers already selected by the other Ethernet nodes connected to the Ethernet bus, and autonomously selects a different unique identifier than the unique identifiers already selected. That is, the Ethernet node keeps track of identifiers of other nodes on the network and takes the tracking into account when selecting an unassigned Node ID. The monitoring and selecting is reflected in 404 and 405 in FIGS. 4, and 504 and 505 in FIG. 5. For DPLCA this includes keeps track of claimed transmit opportunities and includes distinguishing between HARD claims (with COMMIT requests), and SOFT claims (without explicit COMMITs).

For an embodiment, when a collision is detected, the method further includes repeating, by the Ethernet node, attempts to autonomously select another unique node identifier. For an embodiment, repeating, by the Ethernet node, attempts to autonomously select another unique node identifier includes transmitting, by the Ethernet node, over the Ethernet bus either the special symbol or packet during a time slot designated for the other unique node identifier, monitoring, by the Ethernet node, any collisions with the transmitted special symbol or packet, and autonomously selecting, by the Ethernet node, the other node identifier if no collision is detected.

As previously described, for an embodiment, each node identifier is autonomously selected according to a sequence determined by DPLCA functionality contained in the plurality of Ethernet nodes connected to the Ethernet bus. For an embodiment, the sequence starts with any available node identifier (step 506 of FIG. 5). For an embodiment, the sequence starts with a lowest node identifier and increments up (step 406 of FIG. 4).

For an embodiment, at least some other Ethernet nodes connected to the Ethernet bus have a statically configured node identifier. For an embodiment, a one of the plurality of Ethernet nodes autonomously select a node identifier of ID=0. For an embodiment, a one of the plurality of Ethernet nodes is statically assigned a node identifier of ID=0.

As previously described, for an embodiment, the Ethernet node autonomously the unique node identifier of ID=0 further operates as a coordinator node, and transits a beacon that includes a special character set that allows for identification of each of the time slots.

As previously described, for an embodiment, when an Ethernet node of the plurality of Ethernet nodes disconnects from the Ethernet bus, a time slot corresponding with the unique node identifier autonomously by the Ethernet node becomes available for another Ethernet node to autonomously select.

It is to be understood that the processing of FIG. 3 may take place upon initial assignment of the node ID or may be executed on an on-going basis to accommodate removal of a node or insertion of a node that may conflict with a currently assigned/claimed ID (unique identifier). Nodes can continuously selected, drop out, and then reselect an ID again. The process can be executed anytime on a random basis.

FIG. 4 is a flow chart that shows steps of operation of a DPLCA Ethernet network, according to an embodiment. The flow chart of FIG. 4 provides a methodology for node ID assignment and transmit opportunity coordination via DPLCA.

The described embodiments include an Ethernet Network that is designed to overcome fundamental limitation of a mechanism defined in IEEE 802.3cg standard. This standard includes Physical layer based Transmit Opportunity (TO) mechanism for multi-drop topology. The reconciliation sublayer that performs this function is called PLCA. The PLCA as defined by IEEE 803.3cg has a fundamental limitation in the sense that the PHY level Node IDs must be programmed offline into the network equipment prior to adding the Node to the network. This pre-programming requirement prevents dynamic insertion of devices into the network. Also, removal of a Node is not known to other Nodes and results in corresponding transmit slot being wasted. These constraints are highly undesirable in some networks.

The DPLCA sublayer according to the described embodiments are an enhancement over conventional PLCA. Further, the DPLCA sublayer of the described embodiments can operate in the conventional PLCA mode or the DPLCA mode.

In the conventional PLCA mode, DPLCA operates as follows:

Network administrator assigns Node IDs.

Coordinator Node is pre-determined and is assigned ID=0. In contrast, the described embodiments include autonomously selecting a unique node identifier.

Node 0 transmits a BEACON signal for the entire LAN.

Each Node gets a "Transmit Opportunity" (TO) window based on its numerical Node ID in which it can start transmitting DATA. Node ID is assigned prior to adding the node to the network.

Node 0 is the first to get a TO following the BEACON sent by it.

If no DATA is available to transmit, Node remains SILENT during its TO.

If DATA is available, the EN transmits DATA during its TO. After a node finishes transmission of DATA, next node on the network may transmit during its TO.

If a NODE has internal delay between MAC and PHY layers due to integrated circuit implementations, it may transmit COMMIT signal during TO to hold its place in line till it is ready to transmit DATA.

Therefore, each Node has the following transmission options during its TO:
1. DATA—when Data is available to the PHY from MAC.
2. COMMIT—when DATA delay is to be adjusted by the PHY.
3. SILENT—when the Node is present on the network but no Data is available to the PHY from MAC.

The maximum number of Nodes to be allowed on the network is determined by the network administrator and is known by a Node 0. The node 0 sends a BEACON after such known number of nodes have taken the turn to transmit.

In some environment, devices can be added to and removed from the network by the users on an ongoing basis. To accommodate this behavior, Dynamic PLCA (DPLCA) mechanism described below provides means to perform hot-insertion and hot-removal of devices and operates as shown in FIG. 4 as follows:

1. Upon power on (401), a Node may stay in Listen Mode (402) for at least one full Cycle time corresponding to Max Ethernet packet length for N number of nodes. N is the maximum numbers of nodes that are allowed to be on the network.
2. If no BEACON is detected (403), Node assigns (413) itself Temp_Node_ID=0. Step 413 of FIG. 4 is equivalent to step 310 of FIG. 3 when the node is autonomously selecting the unique node identifier of Temp_Node_ID=0.
   a. Node Transmits BEACON (414). Step 414 of FIG. 4 is equivalent to the step 320 of FIG. 3.
   b. If a collision (416) is detected during transmission of BEACON, wait for a Random time and then go back to Listen mode (Step 1 (402)).
   c. If no collision is detected (416), set Node_ID=0 (417)
   d. Transmit BEACON (418)
   e. Transmit PRESENT or COMMIT or DATA in TO corresponding to Node ID=0 (419)
   f. Wait for TOs corresponding to number of PRESENT signals for currently known Non 0 Nodes+1 (420)
   g. Transmit BEACON
3. If BEACON was detected (at 403),
   a. Node further stays in Listen only Mode for at least one full BEACON to BEACON cycle (404)
   b. Identify Nodes present on the Network via presence of PRESENT, COMMIT or DATA in assigned TOs (405)
   c. Set Temporary Node ID (Temp Node ID) to the lowest unassigned Node ID (406).

The Ethernet Node may then autonomously select the Temp Node ID:
   d. Transmit PRESENT (or any other special symbol or Data) during the Next TO for the Temp Node ID (407).
   e. If no Collison is detected (at 408) during the TO when PRESENT is transmitted, Node has secured that ID (409).

The autonomous selection of the Temp Node ID can then be confirmed:
   f. Transmit PRESENT or COMMIT or DATA in TO corresponding to Node ID (410).
   g. If a Collison is detected (at 408) during the TO when PRESENT is transmitted, Node waits for a random amount of time 412 and goes back to Step 4a (404).

If a Node leaves the network, it's TO is SILENT and can be automatically taken by a new Node that joins the network at a later time.

As previously described, for an embodiment, when an Ethernet node of the plurality of Ethernet nodes disconnects from the Ethernet bus, a time slot corresponding with the unique node identifier autonomously by the Ethernet node becomes available for another Ethernet node to autonomously select. The result is a plug and play Ethernet network.

FIG. 5 is a flow chart that shows steps of operation of a DPLCA Ethernet network, according to another embodiment. The flow chart of FIG. 5 provides another methodology for node ID assignment and transmit opportunity coordination via DPLCA. That is, another embodiment for Dynamic PLCA (DPLCA) mechanism to perform hot-insertion and hot-removal of devices and operates as shown in FIG. 5 as follows:

Upon power on (501), a Node may stay in Listen Mode for at least one full Cycle time corresponding to Max Ethernet packet length for N number of nodes 502.

If no BEACON is detected (at 503), Node assigns itself ID=0 (513).

Node Transmits BEACON (514).

If a collision is detected during transmission of BEACON (at 516), wait for a Random time (515) and then go back to Listen mode (502).

If a BEACON is detected (at 503) during this time, the Node further stays in Listen only Mode for at least one full BEACON to BEACON cycle (504).

Identify Nodes present on the Network via presence of PRESENT, COMMIT or DATA in assigned TOs (505).

Set Temporary Node ID (Temp Node ID) randomly to one of the unassigned Node IDs (506).

An autonomous selection has then been made.

Transmit PRESENT (or any other special symbol or Data) during the Next TO for the Temp Node ID (507).

If no Collison is detected (at 508) during the TO when PRESENT is transmitted, Node has secured that ID 509.

The autonomous selection is confirmed.

If a Collison is detected (at 508) during the TO when PRESENT is transmitted, forego this ID and attempt a new ID in next cycle.

If a Node leaves the network, it's TO is SILENT and can be automatically taken by a new Node that joins the network at a later time.

In this implementation, Node 0 sends a BEACON after the time equivalent to TOs of maximum allowed number of nodes has elapsed. For example, if 16 nodes is the maximum allowed on the network, Node 0 must wait for all corresponding 16 TOs to elapse even if only 10 nodes are actually on the network. This is due to the fact that a node may pick up any allowed Node ID and Node 0 does not have knowledge or which nodes may exist on the network in a given cycle.

Thus DPLCA provides full self-configuring PHY level collision avoidance system.

During the TO corresponding to a certain Node ID, the following takes place on the wire (Ethernet bus).
   1. DATA—when Data is available to the PHY from MAC
   2. COMMIT—when DATA delay is to be adjusted by the PHY
   3. PRESENT—when the Node is present but does not intend to use the TO for data transmission
   4. SILENT—when the Node does not exist on the network Thus, DPLCA enables Nodes to self-configure by dynamically identifying available Node IDs and securing a specific Node ID on the network.

It should be noted that DPLCA is not limited to Coaxial cabling. It can be applied to any multi-drop Ethernet network.

Figure 6:
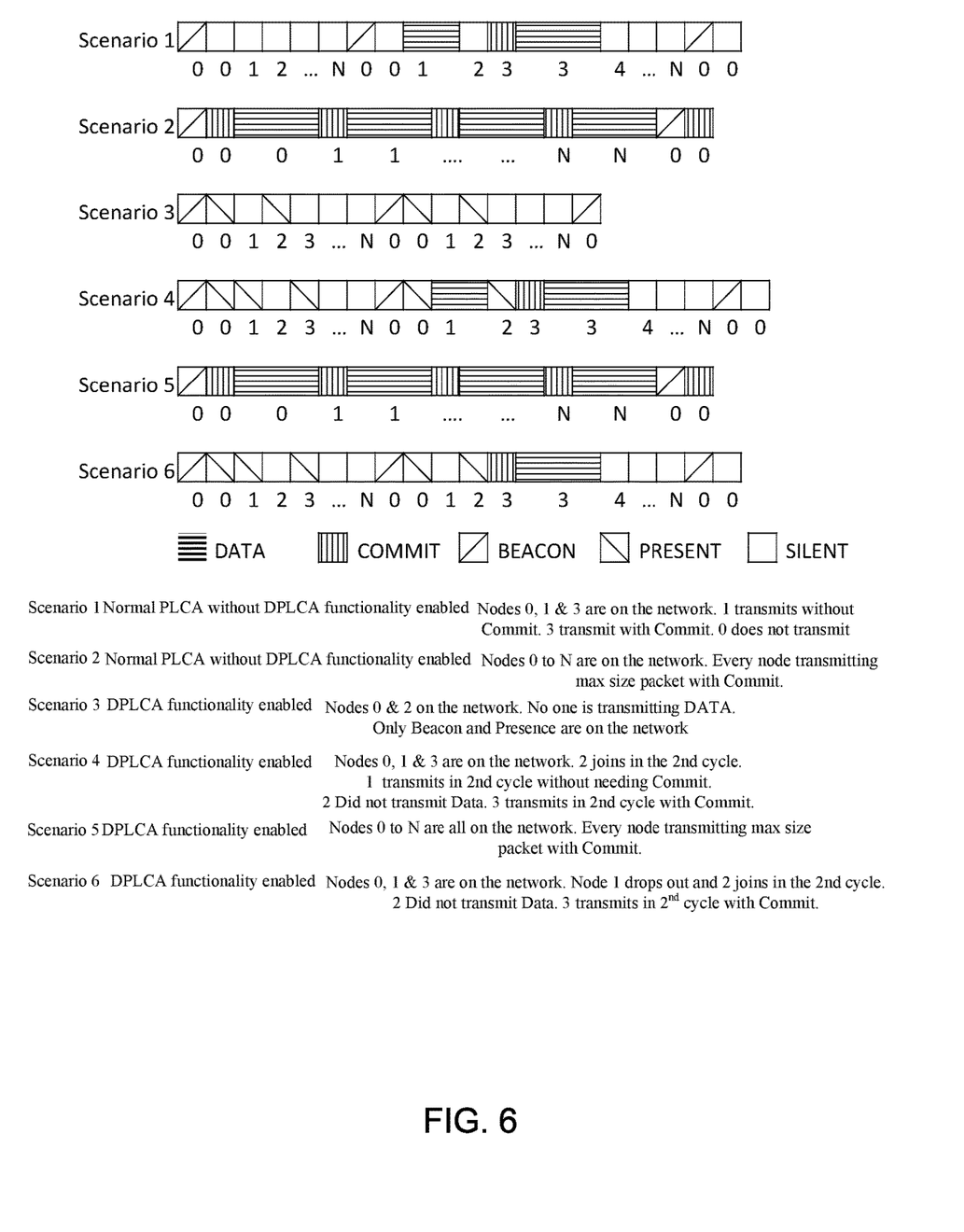
FIG. 6 illustrates sequence of transmission under certain scenarios for the purpose of clarification of network operation, according to at least some embodiments.

FIG. 6 illustrates sequence of transmission under certain scenarios for the purpose of clarification of network operation, according to at least some embodiments.

Scenario 1 Conventional PLCA mode of operation: Nodes 0, 1 & 3 are on the network. Node 1 transmits without Commit. Node 3 transmit with Commit. Node 0 does not transmit Scenario 2 Conventional PLCA mode of operation: Nodes 0 to N are on the network. Every node transmitting max size packet with Commit.

Scenario 3 DPLCA mode: Nodes 0 & 2 on the network. No one is transmitting DATA. Only Beacon and Presence are on the network Scenario 4 DPLCA mode: Nodes 0, 1 & 3 are on the network. Node 2 joins in the 2nd cycle. Node 1 transmits in 2nd cycle without needing Commit. Node 2 Did not transmit Data. Node 3 transmits in 2nd cycle with Commit.

Scenario 5 DPLCA mode: Nodes 0 to N are all on the network. Every node transmitting max size packet with Commit.

Scenario 6 DPLCA mode: Nodes 0, 1 & 3 are on the network. Node 1 drops out and Node 2 joins in the 2nd cycle. Node 2 Did not transmit Data. Node 3 transmits in 2nd cycle with Commit.

Although specific embodiments have been described and illustrated, the embodiments are not to be limited to the specific forms or arrangements of parts so described and illustrated. The described embodiments are to only be limited by the claims.

What is claimed:

1. A Dynamic PHY-Level Collision Avoidance (DPLCA) based Ethernet network, comprising:
   an Ethernet bus comprising a shared cable;
   a plurality of Ethernet nodes connectable to the Ethernet bus, each of the Ethernet nodes operative to:
   autonomously select a unique node identifier, comprising the Ethernet node operating to:
     transmit over the Ethernet bus either a special symbol or packet during a time slot designated for the unique node identifier;
     monitor any collisions with the transmitted special symbol or packet; and
     autonomously select the unique node identifier if no collision is detected.

2. The network of claim 1, further comprising one or more nodes operating to:
   monitor and track unique selected identifiers of other nodes connected to the Ethernet bus;
   wherein the autonomously selecting of the unique node identifier of the node is based on the monitored and tracked unique identifiers of the other nodes.

3. The network of claim 1, wherein when a collision is detected the Ethernet node further operates to:
   repeat autonomous selection of another node identifier, including the Ethernet node operating to:
   transmit over the Ethernet bus either the special symbol or packet during a time slot designated for the other unique node identifier;
   monitor any collisions with the transmitted special symbol or packet; and
   autonomously select the other unique node identifier if no collision is detected.

4. The network of claim 3, wherein each node identifier is autonomously selected according to a sequence determined by DPLCA functionality contained in the plurality of Ethernet nodes connected to the Ethernet bus.

5. The network of claim 4, wherein the sequence starts with any available node identifier.

6. The network of claim 4, wherein the sequence starts with a lowest node identifier and increments up.

7. The network of claim 1, wherein at least some other Ethernet nodes connected to the Ethernet bus have a statically configured node identifier.

8. The network of claim 7, wherein a one of the plurality of Ethernet nodes is statically assigned a node identifier of ID=0.

9. The network of claim 1, wherein a one of the plurality of Ethernet nodes autonomously select a node identifier of ID=0.

10. The network of claim 9, wherein the Ethernet node autonomously selecting the unique node identifier of ID=0 further operates as a coordinator node, and transits a beacon that includes a special character set that allows for identification of each of the time slots.

11. The network of claim 1, wherein when an Ethernet node of the plurality of Ethernet nodes disconnects from the Ethernet bus, a time slot corresponding with the unique node identifier autonomously by the Ethernet node becomes available for another Ethernet node to autonomously select.

12. An Ethernet node operative to:
   autonomously select a unique node identifier, comprising the Ethernet node operating to:
   transmit over an Ethernet bus either a special symbol or packet during a time slot designated for the unique node identifier;
   monitor any collisions with the transmitted special symbol or packet; and
   autonomously select the unique node identifier if no collision is detected.

13. The Ethernet node of claim 12, wherein when a collision is detected, the Ethernet node further operates to:
   autonomously select a second unique node identifier, comprising the Ethernet node operating to:
   transmit over the Ethernet bus either a special symbol or packet during a time slot designated for the second unique node identifier;
   monitor any collisions with the transmitted special symbol or packet; and
   autonomously select the second unique node identifier if no collision is detected.

14. The Ethernet node of claim 12, wherein when a collision is detected, the Ethernet node further operates to:
   repeat attempts to autonomously select another unique node identifier, comprising the Ethernet node operating to:
   transmit over the Ethernet bus either the special symbol or packet during a time slot designated for the other unique node identifier;
   monitoring any collisions with the transmitted special symbol or packet;
   autonomously select the other node identifier if no collision is detected.

15. The Ethernet node of claim 14, wherein when an Ethernet node of the plurality of Ethernet nodes disconnects from the Ethernet bus, a time slot corresponding with the unique node identifier claimed by the Ethernet node becomes available for another Ethernet node to claim.

16. The Ethernet node of claim 12, wherein the Ethernet node further operates to:
   monitor and track unique selected identifiers of other Ethernet nodes connected to the Ethernet bus;
   wherein the autonomously selecting of the unique node identifier of the Ethernet node is based on the monitored and tracked unique selected identifiers of the other Ethernet nodes.

17. A method of operating an Ethernet node, comprising:
autonomously selecting, by the Ethernet node, a unique node identifier, comprising:
transmitting, by the Ethernet node, over an Ethernet bus either a special symbol or packet during a time slot designated for the unique node identifier;
monitoring, by the Ethernet node, any collisions with the transmitted special symbol or packet; and
autonomously selecting, by the Ethernet node, the unique node identifier if no collision is detected.

18. The method of claim 17, wherein when a collision is detected further comprising:
repeating, by the Ethernet node, attempts to autonomously select another unique node identifier, comprising the node operating to:
transmitting, by the Ethernet node, over the Ethernet bus either the special symbol or packet during a time slot designated for the other unique node identifier;
monitoring, by the Ethernet node, any collisions with the transmitted special symbol or packet; and
autonomously selecting, by the Ethernet node, the other node identifier if no collision is detected.

19. The method of claim 18, further comprising
monitoring and tracking, by the Ethernet node, unique selected identifiers of other nodes connected to the Ethernet bus;
wherein the autonomously selecting of the unique node identifier of the Ethernet node is based on the monitored and tracked unique selected identifiers of the other Ethernet nodes.

20. The method of claim 19, wherein when an Ethernet node of the plurality of Ethernet nodes disconnects from the Ethernet bus, a time slot corresponding with the unique node identifier claimed by the Ethernet node becomes available for another Ethernet node to claim.

* * * * *